Patented Aug. 13, 1935

2,010,910

UNITED STATES PATENT OFFICE 2,010,910

DENTAL CLEANING AND POLISHING COMPOUND

Malcolm W. Atkins, Worcester, Mass.

No Drawing. Application May 4, 1932,
Serial No. 609,272

6 Claims. (Cl. 167—93)

The present invention relates in general to compounds for cleaning and/or polishing the teeth.

All such compounds now in ordinary use contain, in varying amounts, an abrasive substance, i. e., powdered pumice or flour of pumice,—this substance being present in relatively large amounts in the compounds used by dentists for dental prophylaxis, and also being present in relatively smaller amounts in practically all tooth powders and tooth pastes which are sold to the public for use in brushing the teeth.

Pumice is the name given to volcanic glass when it occurs in a frothy cellular condition, and the crushing and grinding of this substance, chiefly silica, to form powdered pumice or flour of pumice, breaks down the cellular structure and produces minute, fine, hard particles which, by their presence in dental compounds, have a scratching rather than a true polishing effect, because said particles are not broken down further under the pressures used in dental prophylaxis, or in brushing the teeth. As a result, the usual dental prophylaxis, employing a compound largely constituted by flour of pumice, gives the patient a harsh gritty sensation when the teeth are rubbed together, similar to that caused by the presence of very fine sand in the mouth.

I have discovered that dental cleaning and polishing compounds, both for dental prophylaxis and for ordinary brushing of the teeth, can be very materially improved, not only in their efficacy but also in the elimination of unpleasant after-effects, by dispensing with powdered pumice or flour of pumice as an ingredient thereof. My invention resides in the discovery that alumina or aluminium oxide ($Al_2O_3$) in the crystalline form produced by the Bayer process is the ideal cleaning and polishing agent for dental prophylaxis compounds, and also for tooth pastes and powders employed in the ordinary brushing of the teeth.

Such Bayer process alumina is the product obtained by the precipitation of aluminium hydrate from a solution of sodium aluminate,—the hydrate subsequently being calcined at a relatively low temperature. The resulting fine granular or powdery product, having a hardness very much less than that of emery or fused alumina (alundum), is found to be a better and safer polishing ingredient for dental prophylaxis compounds and for dentifrices than flour of pumice, for the following reasons:

The minute granules of Bayer process alumina are usually in the form of clusters of even more minute crystals composed variously of corundum, gibbsite, diaspore and aluminium hydrate. Such material retains its cluster form under a pressure sufficient to clean the surface film from the teeth, but under any higher pressure, the cluster particles break down, so that no scratching of the teeth will result before the breakdown occurs; the extremely minute flaky crystals resulting from such breakdown provide a true polishing medium of the highest efficiency, wholly incapable of producing in the patient's mouth any harsh, gritty or sandy sensation.

A dental prophylaxis compound embodying my invention is exemplified by the following formula:—

| | Per cent |
|---|---|
| Alumina (Bayer process), approximately | 71 |
| Corn starch, approximately | 15 |
| Boric acid, approximately | 10 |
| Alum, approximately | 4 |
| | 100 |

The above formula is given merely by way of example; obviously, the constituents thereof and the percentages or proportions of such constituents can be widely varied, without departing from the scope of my invention as defined in the appended claims. Obviously, also, it is within the scope of my invention to provide such a compound either in powdered form, or in paste form, or in tablet form, by the use of any expedient to produce such forms now known in the art.

A tooth paste, for use in the daily brushing of the teeth, and embodying my invention, may be compounded from say, 15–20% of Bayer process alumina, in conjunction with suitable proportions or percentages of sodium bicarbonate, soap (as an emollient), alum (as an astringent) and preferably a magnesium compound (as a neutralizer of acidity). Similarly a tooth powder for the same purposes may be compounded by the use of all these ingredients excepting the soap.

I claim,

1. A dental compound, containing as a cleaning and polishing agent Bayer process alumina.

2. A dental compound, containing as a cleaning and polishing agent alumina or aluminium oxide in cluster-crystal form, and adapted under moderate pressure to break down into minute flaky crystals.

3. As a new article of manufacture, a dental prophylaxis tablet consisting of at least 50% of Bayer process alumina.

4. A dental prophylaxis compound containing at least 50% of Bayer process alumina, mixed with smaller proportions of corn starch, boric acid and alum.

5. A tooth powder or paste containing less than 25% of Bayer process alumina, in admixture with an astringent, an emollient, and a magnesium compound.

6. A dental compound, containing as a cleaning and polishing agent a fine grained product, comprising calcined hydrated (Bayer process) alumina in cluster-crystal form and of a hardness materially less than that of fused alumina.

MALCOLM W. ATKINS.